US009276982B2

(12) United States Patent
Cholkar et al.

(10) Patent No.: US 9,276,982 B2
(45) Date of Patent: Mar. 1, 2016

(54) MULTIMEDIA CONVERSATION TRANSFER

(71) Applicant: GENBAND US LLC, Frisco, TX (US)

(72) Inventors: Arjun Cholkar, Frisco, TX (US); Anthony Jones, Ottawa (CA); Ibrahim Dogru, Istanbul (TR); Don Gilchrist, Frisco, TX (US); Dany Sylvain, Quebec (CA)

(73) Assignee: GENBAND US LLC, Frisco, TX (US)

( * ) Notice: Subject to any disclaimer, the term of this patent is extended or adjusted under 35 U.S.C. 154(b) by 0 days.

(21) Appl. No.: 14/327,090

(22) Filed: Jul. 9, 2014

(65) Prior Publication Data

US 2016/0014178 A1  Jan. 14, 2016

(51) Int. Cl.
*H04N 7/14* (2006.01)
*H04L 29/06* (2006.01)
*H04N 7/173* (2011.01)

(52) U.S. Cl.
CPC ........... *H04L 65/601* (2013.01); *H04L 65/1016* (2013.01); *H04L 65/1063* (2013.01); *H04N 7/173* (2013.01)

(58) Field of Classification Search
CPC . H04N 7/173; H04L 65/1063; H04L 65/1016
USPC ........................ 348/14.12; 709/227
See application file for complete search history.

(56) References Cited

U.S. PATENT DOCUMENTS

| 7,593,741 | B1 * | 9/2009 | Amin et al. ................... 455/462 |
| 2009/0265454 | A1 * | 10/2009 | Bordewisch et al. ......... 709/223 |
| 2013/0318248 | A1 * | 11/2013 | Kim et al. .................... 709/227 |
| 2015/0042750 | A1 * | 2/2015 | Vivekanandan et al. ... 348/14.08 |

OTHER PUBLICATIONS

Stephen Cho, "Hangouts Enrich Apps Everywhere With Video Meetings", Google: Official Enterprise Blog, Jun. 3, 2014, http://googleenterprise.blogspot.com/2014/06/hangouts-enrich-apps-everywhere-with.html, accessed on Sep. 12, 2014.
Google Hangouts—A Complete Guide, http://www.youtube.com/watch?v=C3WouWiu7pI, Pub. Jan. 14, 2014, accessed on Sep. 12, 2014.
Avaya Flare Experience Guided Tour, http://www.avaya.com/usa/campaign/avaya-flare-experience-guided-tour/, accessed on Sep. 12, 2014.
Genband Smart Office, https://www.youtube.com/watch?v=J5Eko1bti_U, Pub. Feb. 18, 2013, accessed on Sep. 12, 2014.
MWC13 Genband Smart Office, https://www.youtube.com/watch?v=n26wdugnT7M, Pub. Mar. 25, 2013, accessed on Sep. 12, 2014.
Smart Office Conversation Manager Demo, https://www.youtube.com/watch?v=DAM6a4Tk01U, Pub Mar. 24, 2014, accessed on Sep. 12, 2014.

* cited by examiner

*Primary Examiner* — Creighton Smith
(74) *Attorney, Agent, or Firm* — Haynes and Boone, LLP

(57) ABSTRACT

A method performed by a conversation manager in a communications network includes establishing a multimedia conversation between a first device associated with a first user and at least one endpoint associated with at least one other user, the multimedia conversation comprising at least two different media types according to respective and different protocol types. The method further includes receiving an instruction to transfer the conversation from the first device of the first user to a second device, adding the second device to the multimedia conversation by establishing connections for the at least two different media types to the second device, and removing the first device from the multimedia conversation by removing connections for the at least two media types to the first device.

28 Claims, 9 Drawing Sheets

MULTIMEDIA CONVERSATION TRANSFER

BACKGROUND

The present disclosure relates generally to communication management, and more particularly to methods and systems for transferring communications between devices.

People often communicate using various types of media. For example, people may engage in voice communication over the phone, whether by a landline, mobile phone, or voice over internet protocol (VOIP) applications. Additionally, users may use email and instant messaging applications. Other methods such as video conferencing and document sharing technologies are available as well.

In general, when one user is communicating with another user using one type of media and desires to use a second type of media, the user has to manually connect or set up a connection with the new media. For example, if a user is on a phone call with another user and desires to share his or her computer desktop with the other user, the user has to manually set up the desktop sharing with the other user. This typically involves sending a link via email to the other user. Additionally, a user may wish to change devices during a communication session.

Managing multiple applications and media types can often be a daunting task for a user. This can have an adverse effect on productivity. Additionally, this may be a source of frustration for a user. Thus, it is desirable to provide methods and systems that provide a better user experience for various communication applications.

SUMMARY

According to one example, a method performed by a conversation manager in a communications network includes establishing a multimedia conversation between a first device associated with a first user and at least one endpoint associated with at least one other user, the multimedia conversation comprising at least two different media types according to respective and different protocol types. The method further includes receiving an instruction to transfer the conversation from the first device of the first user to a second device, adding the second device to the multimedia conversation by establishing connections for the at least two different media types to the second device, and removing the first device from the multimedia conversation by removing connections for the at least two media types to the first device.

According to one examples, a computer program product comprising machine readable instructions on a non-transitory storage medium. The computer program product includes computer program code for sending a request to grab a multimedia conversation from an active client device, the active client device being active within the multimedia conversation, the multimedia conversation comprising communication sessions that include multiple media types defined by respective media communication protocols. The computer program code further includes computer program code for establishing a connection with endpoints of the multimedia conversation using at least a subset of the communication protocols of the multimedia conversation. Wherein establishing the connection includes removing the active client device from the multimedia conversation.

A computing system includes a processor and a memory comprising machine readable instructions that when executed by the processor, cause the system to establish a multimedia conversation between a first device associated with a first user and at least one endpoint associated with at least one other user, the multimedia conversation comprising at least two different media types according to a variety of media protocol types. The machine readable instructions are further to receive an instruction to transfer the conversation from the first device of the first user to a second device, add the second device to the multimedia conversation by establishing connections for the at least two different media types to the second device, and remove the first device from the multimedia conversation by removing connections for the at least two media types to the first device.

BRIEF DESCRIPTION OF THE DRAWINGS

Aspects of the present disclosure are best understood from the following detailed description when read with the accompanying figures.

Figure 1:
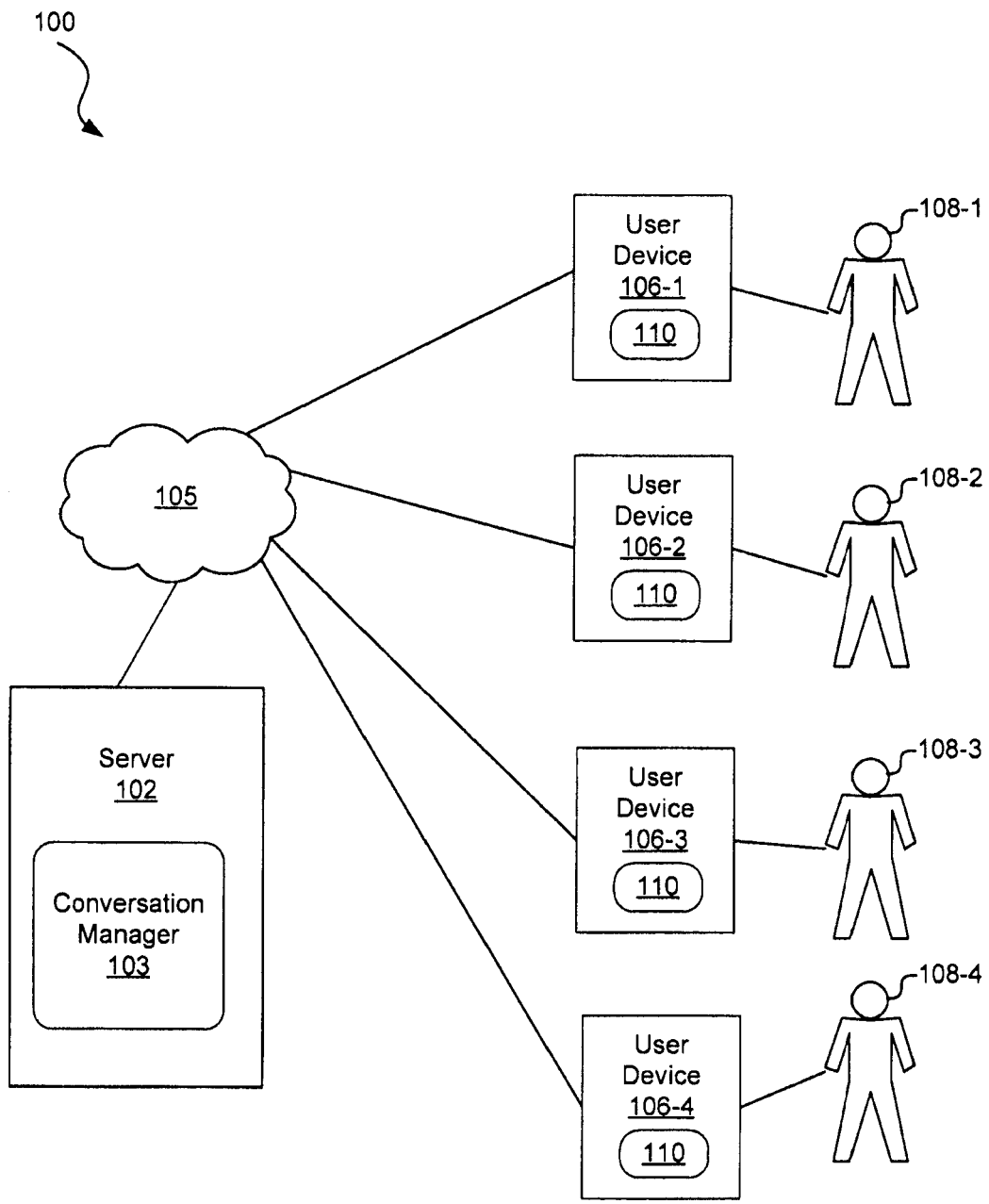
FIG. 1 is a diagram showing an illustrative network environment in which multiple users may communicate using multiple types of media, according to one example of principles described herein.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, a user of conventional systems has to manage multiple communication applications when communicating with different types of media. Managing multiple applications and media types can often be a daunting task for a user. Such tasks become increasingly complex when a user would like to switch devices. For example, a user may be engaged in a conversation that involves both audio/video and instant messaging between multiple parties. The user may be using a device such as a desktop computer. It may be the case that the user has to move to a different location, and would like to switch to a different device such as a tablet device or a smartphone device. The user typically has to exit the communication session on the desktop computer and then re-establish communication with the other parties using the tablet or smartphone device. This can be a source of frustration for the user.

According to principles described herein, a user may seamlessly transfer a multimedia conversation from a first device to a second device. This may be done by sending a command from the first device, which will be referred to as "pushing" the conversation. Alternatively, the user may send a command from the second device, which will be referred to as "grabbing" the conversation. Specifically, when a user sends the command to transfer a multimedia conversation to the second device, the data streams being transferred between the first device and other conversation participants are duplicated and transferred to the second device. This connects the second device to the multimedia conversation. Then, the data streams to the first device can be shut down. Because the multimedia conversation may involve multiple media types using multiple different protocols, the data streams for each protocol are set up on the second device and shut down on the first device.

In one example, a conversation manager may be used to transfer multimedia conversations as described above. A conversation manager is an application that runs on one or more computing devices and is responsible for establishing multimedia communications between multiple parties. In one example, a user may wish to use a tablet device to grab a multimedia conversation from a laptop computing device. The user thus sends a grab command from the tablet device to the conversation manager. The conversation manager then establishes data streams between the tablet device and the other conversation participants. These data streams include media data adopted to the various protocols currently being used in the multimedia conversation. After the tablet device has successfully been added to the conversation, the data streams being transmitted to the laptop device are shut down. Thus, the multiparty, multiprotocol conversation is seamlessly transferred to a different device.

FIG. 1 is a diagram showing an illustrative network environment 100 in which multiple users 108 communicate using multiple types of media, according to one embodiment. According to the present example, the network environment 100 includes a server 102 and a number of devices 106. Each device 106 is associated with a particular user 108. Each device 106 also has a multimedia communication application 110 installed thereon. The multimedia communication applications 110 communicate over the network 105 with a conversation manager 103 running on the server 102.

The server 102 includes software and hardware that responds to requests over the network 105. Specifically, the server 102 receives requests from various devices 106 over the network 105. The server 102 then responds to those requests accordingly. Such requests may include requests to establish communication from one device 106 to another. In some examples, multiple servers 102 may be used in concert to perform the functions described herein.

The server 102 includes a communication application that will be referred to as the conversation manager 103. In this example, a conversation includes a communication involving two or more users and two or more types of media. Thus, the conversation manager 103 manages communication sessions involving two or more types of media and between two or more end user devices.

The network 105 may include various types of networks involving multiple types of physical media and transport protocols. For example, the network 105 may include a Local Area Network (LAN) using Ethernet, wireless, and fiber optic connections. The network 105 may also include the Internet. The network 105 may use various transmission protocols such as Real-time Transfer Protocol (RTP), Session Information Protocol (SIP), and Hypertext Transfer Protocol (HTTP) to transmit data in the form of packets between user devices 106. The network 105 may also include mobile data networks such as Long Term Evolution (LTE) networks. The scope of embodiments is not limited to any particular network technology for use as, or in, network 105.

The user devices 106 may include a variety of different devices such as desktop computers, laptop computers, tablet computing devices, mobile smart phones and others. Different devices 106 may have different media capabilities. For example, desktop computers, laptop computers, and some tablet computing devices may have the capability of sharing the desktop with another device. But, smart phones may not have such capability.

Each device 106 has a multimedia communication application 110 installed thereon. The multimedia communication application 110 provides users 108 of their respective devices 106 with the tools to communicate with each other using various types of media. Thus, the multimedia communication application 110 is designed for use with various types of protocols for different types of media. As described above, such protocols may include, but are not limited to, RTP, SIP, HTTP, and SMS.

Each device 106 may be associated with a specific user 108. For example, the first device 106-1 is associated with the first user 108-1, the second device 106-2 is associated with the second user 108-2, the third device 106-3 is associated with the third user 108-3, and the fourth device 106-4 is associated with the fourth user 108-4. In one example, each user is associated with a unique identification string such as a SIP username. Thus, when a user of one device wishes to contact another user, he or she can use that user's unique identification string to make such contact. The conversation manager 103 can associate a user's unique identification string with a protocol address associated with that user's device. For example, the conversation manager 103 may associate a user's unique identification number with a specific Media Access Control (MAC) address or an Internet Protocol (IP) address.

In some examples, a user 108 has an account registered with the conversation manager 103. The user 108 may access his or her account through any device 106 having the multimedia communication application 110 installed thereon. When a user logs in through the multimedia communication application 110 of a specific device 106, the conversation manager 103 can register that device 106 with the unique identification number for that user. Thus, when anyone attempts to start a multimedia conversation with that user, the packet stream will be directed to the proper device. Furthermore, although not shown herein, a single user may be associated with, or logged-in at, more than one device at a time.

The conversation manager 103 may maintain a database of ongoing and previous conversations. Each conversation may be represented by a data structure that includes a unique conversation identifier such as a conversation number. The data structure may also indicate the users involved, the devices being used by those users, and the capabilities of those devices. In one example, the data structure also indicates the types of media involved and the protocols used to transmit those different types of media over the network 105.

Figure 2:
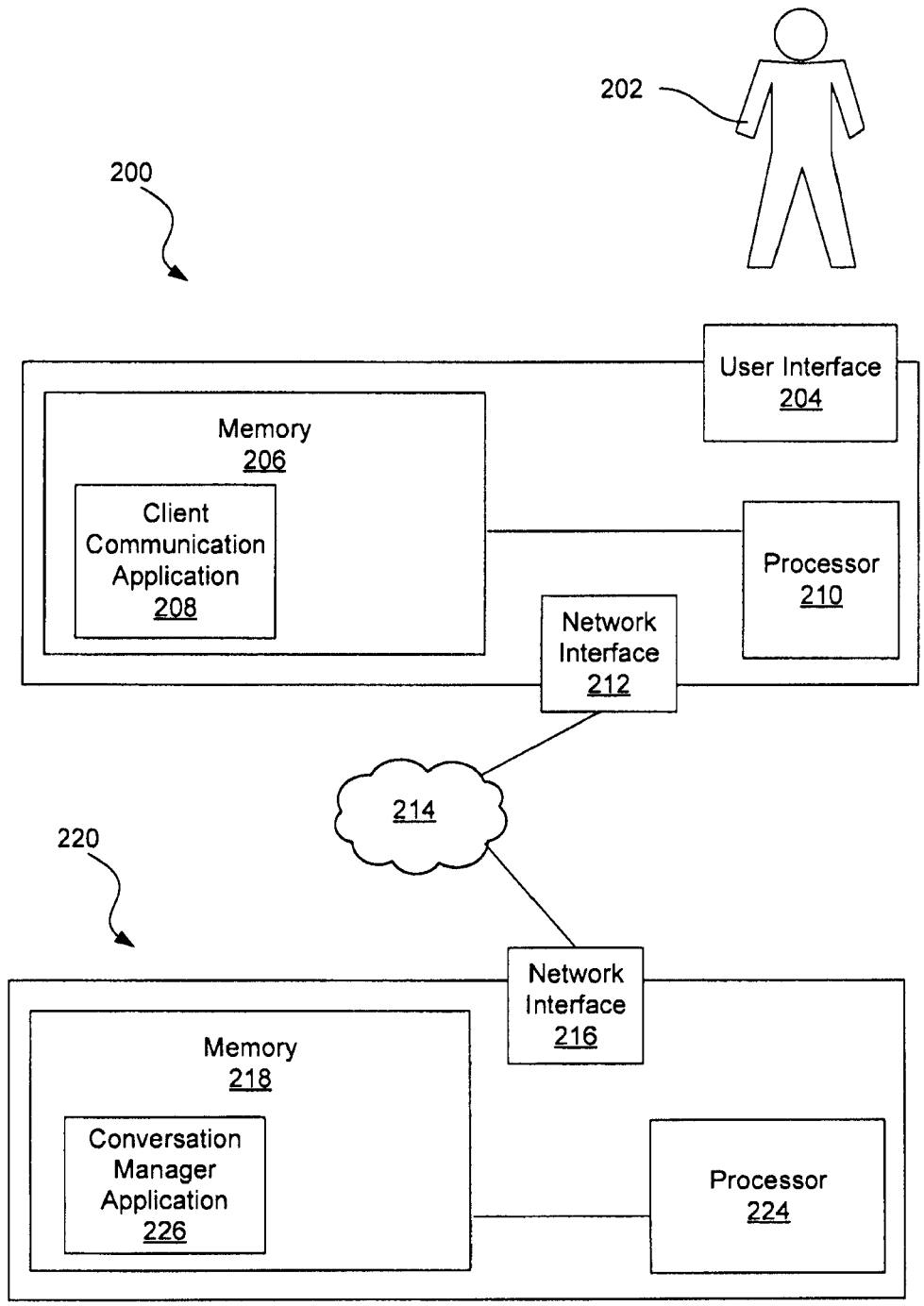
FIG. 2 is a diagram showing an illustrative client/server system, according to one example of principles described herein.

FIG. 2 is a diagram showing an illustrative client/server system. According to the present example, the client system 200 may include a user device such as a desktop computer, laptop computer, smartphone device, or tablet device. The server system 220 can also include any appropriate hardware such as a general purpose computer or other device. An example server includes a multi-processor general purpose computer running an operating system such as Linux. The server system 220 may facilitate communication between various client devices operated by different users having the multimedia communication application 208 installed thereon. The server system 220 runs the conversation manager application 226 that serves requests from the client communication application 208 running on client devices 200. In one example, server 220 is an embodiment of server 102 of FIG. 1 and client 200 may be an embodiment of a user device 106 of FIG. 1.

According to certain illustrative examples, the client system 200 includes a memory 206 which may include software such as the client communication application 208. The client system 200 also includes a processor 210, a network interface 212, and a user interface 204.

The memory 206 may be one of several different types of memory. Some types of memory, such as non-volatile types of memory, typically have large storage volume but relatively slow performance. Volatile memory, such as those used for Random Access Memory (RAM), are optimized for speed and are often referred to as "working memory." The server memory 218 may also include various types of memory such as volatile or non-volatile memory. In some embodiments, the software is stored as computer-readable code in memory 206, 218 and executed by processors 210 and 224 respectively.

The client system 200 also includes a processor 210 for executing software and using or updating data stored in memory 206. The software may include an operating system and various other software applications. In addition to the communication application 208, the client device may include other software such as other communication applications, which may interface with the communication application, and other productivity applications such as word processing and web browsing.

The user interface 204 may include a number of input devices such as a mouse, touchpad, or touchscreen that allow the user 202 to interact with a GUI. The user interface 204 may also include a number of different types of output devices such as a monitor or a touchscreen. The user interface allows the user 202 to interact with the client system 200.

The network interface 212 may include hardware and software that allows the client system 200 to communicate with other devices over a network 214. The network interface 212 may be designed to communicate with the network 214 through hardwire media or wireless media as appropriate. Examples of networks for use in system 214 include the Internet, a LAN, a cellular network or any other appropriate network.

According to certain illustrative examples, the server system 220 includes a memory 218 and a processor 224. The memory may have stored thereon the conversation manager application 226. The server system 220 also includes a network interface 216 for communicating with other devices such as the client system 200.

The conversation manager application 226 may be similar to the conversation manager 103 described above. The implementation of the features described above may be distributed between the server side application 226 and the client side application 208 in a variety of ways.

Figure 3:
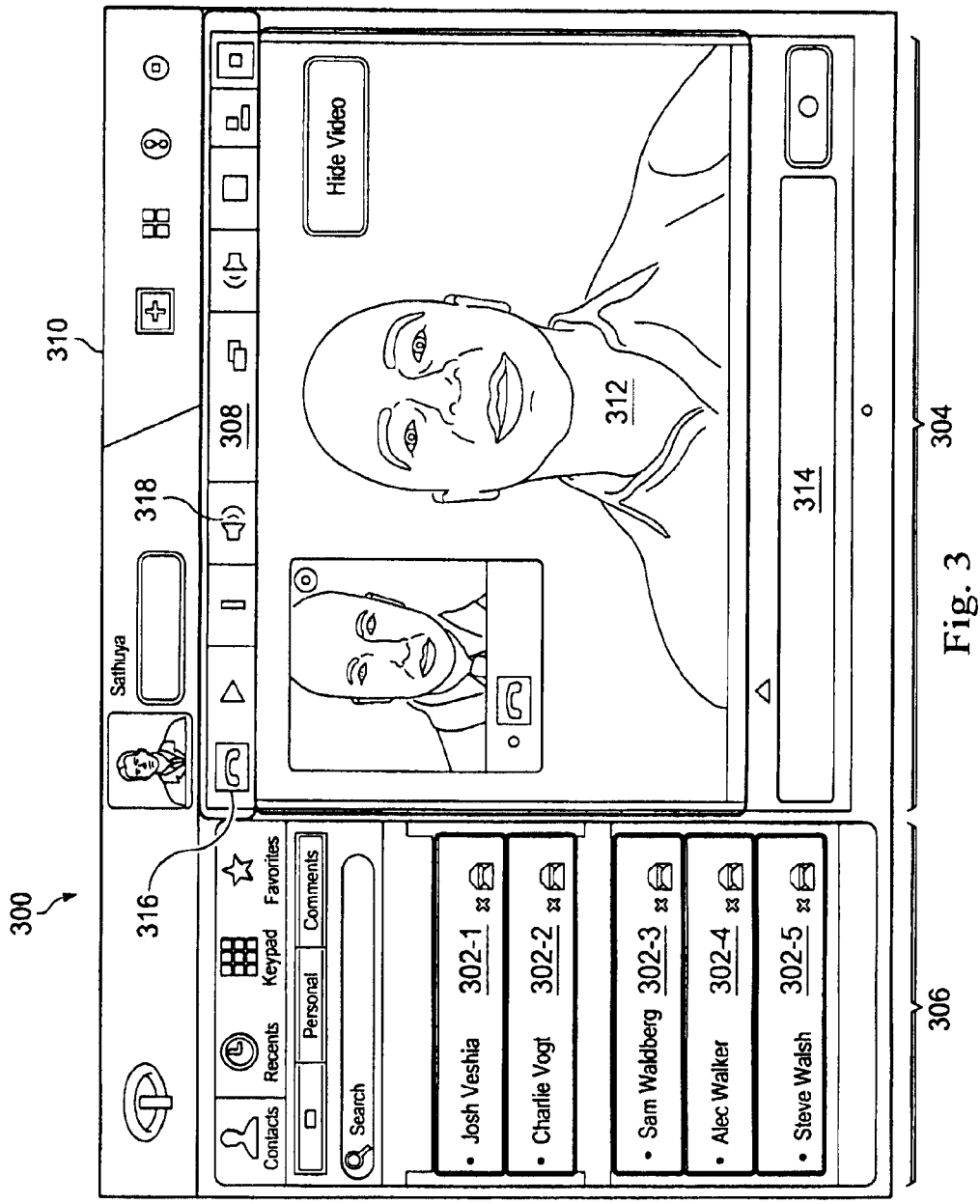
FIG. 3 is a diagram showing an illustrative graphical user interface for a multimedia communication application, according to one example of principles described herein.

FIG. 3 is a diagram showing an illustrative graphical user interface for a multimedia communication application. For purposes of discussion, the user operating the illustrated graphical user interface 300 will be referred to as the operating user. In this example, a client device would display the graphical user interface 300 to the operating user. According to the present example, the user interface 300 includes a contact list 306 displaying a number of contact objects 302. The user interface 300 also includes a conversation container 304 and a toolbar 308.

The contact list 306 displays a list of contact objects 302. Each contact object represents another user having an account with the multimedia communication system. In this example, a first contact is represented by a first contact object 302-1, a second contact is represented by a second contact object 302-2, a third contact is represented by a third contact object 302-3, a fourth contact is represented by a fourth contact object 302-4, and a fifth contact is represented by a fifth contact object 302-5. The contact list 306 may be specific to the operating user. Each specific user may have a different set of contacts with which he or she communicates. In some embodiments, the contact list 306 may be shared among a group of users, such as employees of a company.

The conversation container 304 is a region within the graphical user interface 300 that represents any ongoing communication sessions between other users. In this example, the conversation container 304 is an active object within interface 300, and the operating user interacts with the container 304 to manage conversations as described below. As mentioned above, a multimedia conversation includes a communication between two or more users and involving two or more media types. Thus, the appearance of the conversation container 304 will depend on the nature of the present conversation.

In the present example, the multimedia conversation includes audio and video communication 312 and chat communication 314. Thus, the conversation container 304 displays the video stream to the operating user. Other combinations of conversation media may be used as well. For example, a conversation may include voice and screen sharing, or video and document sharing. Other combinations of media are contemplated as well.

The conversation toolbar 308 may provide the user with a number of selectable objects related to the conversation represented by the conversation container 304. For example, the user may select an object 316 on the toolbar 308 to initiate or terminate communication with various users. The user may select an object 318 on the toolbar 308 to increase or lower volume. The operating user may further add new media types or new users to the present conversation by selecting an object 316 from the toolbar 308.

Figure 4A:
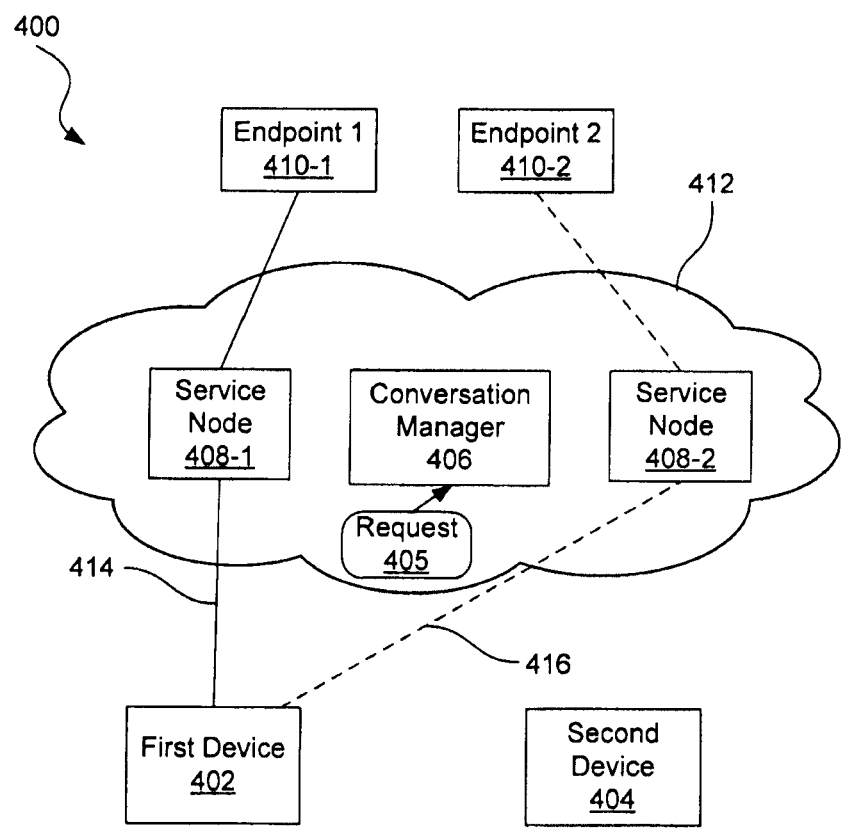
FIGS. 4A-4C are diagrams showing an illustrative transfer of a multimedia conversation between devices, according to one example of principles described herein.
Figure 4B:
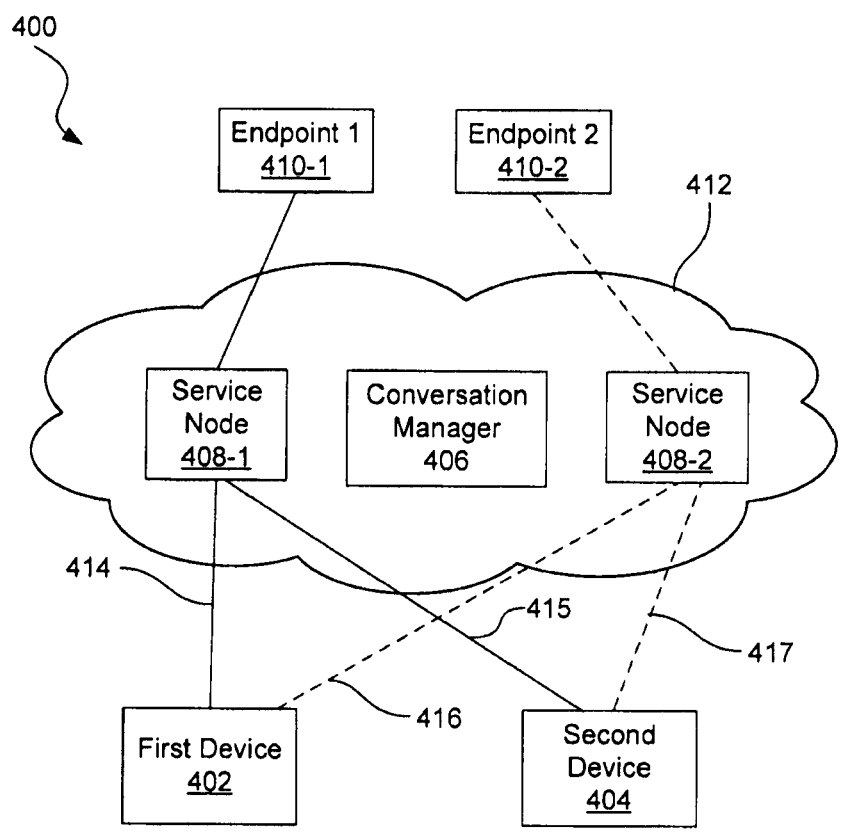
Figure 4C:
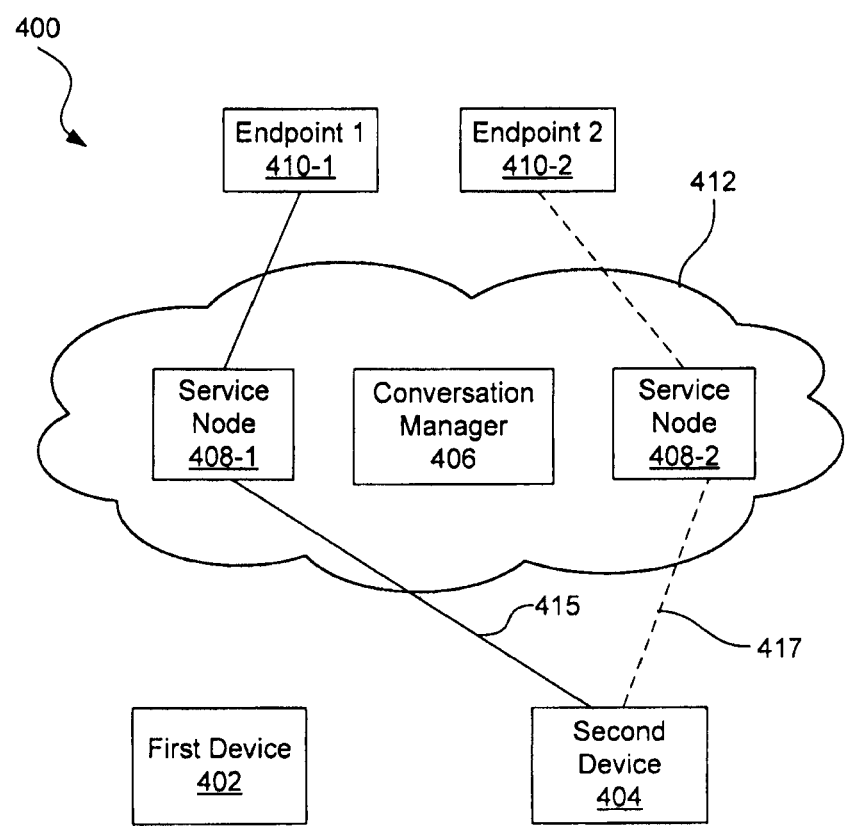

FIGS. 4A-4C are diagrams showing an illustrative transfer of a multimedia conversation between devices. According to the present example, a first device 402 is engaged in a multimedia conversation that involves at least two types of media. For example a first type communication session 414 uses a first type of protocol, and a second type communication session 416 uses a different second type protocol. In one example, the first type communication session 414 is a video conferencing communication session and the second type communication session 416 is a text-based communication session. The first type communication session passes through a first service node 408-1 and the second type communication session passes through a second service node 408-2. A service node 408 may be any physical device that routes, switches, or otherwise handles data streams being transferred over a network such as the Internet. Both service nodes may be in communication with a conversation manager 406. Examples of the various protocols include Real-time Transfer Protocol (RTP), Session Initiation Protocol (SIP), Hypertext Transfer Protocol (HTTP), Extensive Messaging Presence Protocol (XMPP), Representational State Transfer (REST), and Simple Object Access Protocol (SOAP).

In this example, the first type communication session 414 is between the first device 402 and a first endpoint 410-1. The second type communication session 416 is between the first device and a second endpoint 410-2. In some examples, both endpoints 410 correspond to the same device. For instance, end points 410 may represent communication applications. Specifically, a single device, such as a laptop computer or desktop computer, is being used to engage in the multimedia conversation. In some examples, however, the two endpoints 410 may be on two separate devices. For example, the first endpoint 410-1 may be a laptop computer and the second endpoint 410-2 may be a mobile smartphone. Both the laptop and the mobile smartphone may be used simultaneously by the same user.

As described above, the conversation manager 406 is responsible for establishing communication sessions between multiple parties. Thus, the conversation manager 406 establishes the communication sessions 414, 416 between the first device 402 and the endpoints 410. Additionally, the conversation manager 406 handles the transfer of the multimedia conversation from the first device 402 to the second device 404.

Establishing a communication may include using, e.g., SIP to set up an RTP audio/video stream. SIP works in concert with other protocols and is generally involved in the signaling portion of a communication session. SIP clients typically use TCP or UDP to connect to SIP servers and other SIP endpoints. SIP is often used in setting up and tearing down voice or video calls. In this example, the voice and video stream communications in SIP applications are carried over another application protocol, the Real-time Transport Protocol (RTP). Parameters (port numbers, protocols, codecs) for these media streams are defined and negotiated using the Session Description Protocol (SDP) which is transported in the SIP packet body. However, the scope of embodiments includes any appropriate signaling protocol and media protocol for multimedia conversation.

In the present example, the first device is a desktop computer. An operating user of the desktop computer is engaged in the multimedia conversation involving the first type communication session 414 and the second type communication session 416 with a different user associated with the endpoints 410. The operating user wishes to switch the multimedia conversation from the first device to the second device 404, which in this example is a tablet device.

According to the present example, a request 405 is sent to the conversation manager 406. The request indicates that the user wishes to switch from the first device to the second device. In one example, the request is sent from the first device. For example, the user may select an option within the communication application of the first device that selects a list of registered devices eligible for transfer. In response to such action, the request 405 is sent form the first device 402 to the conversation manager.

In some examples, the request 405 is sent from the second device 404 to the conversation manager 406. This may be done by the operating user selecting a particular command within a communication application of the second device 404. In one example, the user may enter a code into the communication application of the second device. This code may be unique to the present conversation. This code may be provided to the user through the communication application of the first device 402.

In one example, the sending of the request 405 is triggered by the second device 404 coming into proximity with the first device 402. For example, both devices 402, 404 may have Near Field Communication (NFC) tags. NFC is a method of transferring data between two endpoints in close proximity to each other. In the present example, the NFC tags may transfer any data that may be used to identify the device and indicate that the user wishes to switch to such a device. For example, by moving the NFC tag of the second device in close proximity with the NFC tag of the first device, various data may be communicated from the second device 404 to the first device 402. This data can then be used to send a request 405 to the conversation manager 406 to transfer the multimedia conversation. Such data may include network addresses such as Media Access Control (MAC) addresses or Internet Protocol (IP) addresses. Other proximity mechanisms such as Radio Frequency Identification (RFID) tags may be used as well.

FIG. 4B is a diagram showing establishment of duplicate streams of data for the multimedia conversation. In response to receiving the request 405, the conversation manager 406 establishes a duplicate first type communication session 415 between the second device 404 and the first service node 408-1. Additionally, the conversation manager 406 establishes a duplicate second type communication session 417 between the second device 404 and the second service node 408-2.

FIG. 4C is a diagram showing the shutdown of the original communication sessions 414, 416 to the first device. After the duplicate communication sessions 415, 417 have successfully been established, the conversation manager 406 can cause the original communication sessions 414, 416 to be shut down. Thus, the multimedia, multiprotocol conversation has successfully been transferred to the second device.

In some examples, the second device 404 may not have all of the capabilities of the first device. In one example, the first type communication session 414 is an audio/video communication session, and the second type communication session 416 is a screen sharing communication session. Additionally, the first device 402 is a desktop computing device and the second device 404 is a mobile phone. Furthermore, the mobile phone 404 is incapable of document sharing. But, the mobile phone is capable of audio/video streaming. Thus, when the multimedia conversation transfers from the first device 402 to the second device 404, only the audio/video communication session is transferred. The operating user is thus no longer part of the screen sharing aspect of the multimedia conversation.

In some cases, however, when the operating user again switches the conversation to a device that does have screen sharing capability, the screen sharing aspect of the multimedia conversation can be automatically reestablished. For example, the first device 402 may be a user's work computer at the user's work office. The user may wish to transfer a multimedia conversation to a mobile device while the user travels home. Upon arriving at home, the user may transfer the multimedia conversation from the mobile device to the user's home computer, which does have screen sharing capability. The user may then be prompted to determine whether reestablishment of the screen sharing communication session is desired. If the user so chooses, the screen sharing capability may be reestablished.

Figure 5A:
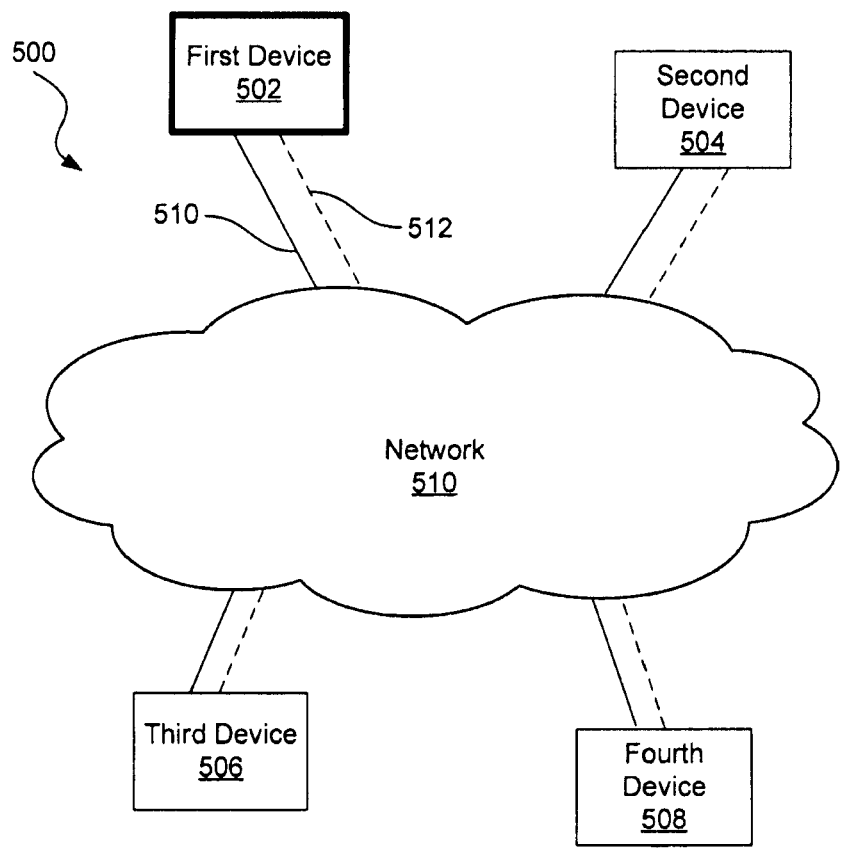
FIGS. 5A-5B are diagrams showing an illustrative transfer of moderator rights, according to one example of principles described herein.
Figure 5B:
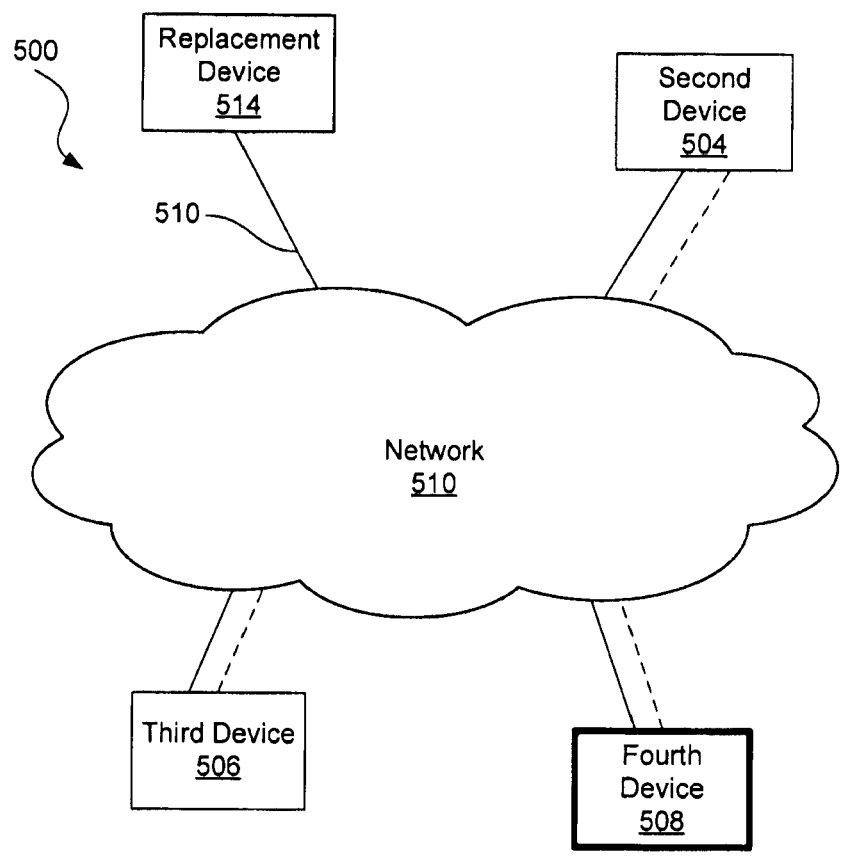

FIGS. 5A-5B are diagrams showing an illustrative transfer of moderator rights. According to the present example, four different users, each with a different device, are engaged in a multimedia conversation involving a first type of media 510 and a second type of media 512 over a network 510. Specifically, a first user is using a first device 502, a second user is using a second device 504, a third user is using a third device 506, and a fourth user is using a fourth device 508 to engage in the multimedia conversation.

In this example, the first user has moderator rights. This is indicated by the highlighted box associated with the first device 502. Moderator rights include a variety of privileges associated with moderating a multimedia conversation. For example, the moderator may have the ability to invite other users to the multimedia conversation or remove current participants to the multimedia conversation. The moderator may have the ability to add additional media types to the conversation. For example, the moderator can add a screen sharing type of media to a conversation that presently includes voice and video communication.

In some examples, the user of the first device 502 may wish to switch the conversation to a different device. But, it may also be the case that device to which the first user wishes to switch does not have the capabilities for moderating the conversation. For example, the first device 502 is a desktop computer and the first type of media is a voice call and the second type of media is a screen sharing function. The first user may wish to switch the conversation to his or her mobile phone. But, the mobile phone 502 is not capable of handling the screen sharing function. Thus, moderator rights can be passed to another user.

FIG. 5B is a diagram showing moderator rights with a different user. Specifically, the moderator rights have been passed to the fourth user using the fourth device 508. The moderator rights may be passed automatically when the request to transfer the conversation to a new device is sent to the conversation manager. In some cases, however, moderator rights are passed only in response to a command from the current moderator. Moderator rights may be denoted by the conversation manager. For example, a data structure that represents the conversation may include a field that specifies which user has moderator rights and what those rights include. Thus, changing moderator rights may include changing data in one or more stored fields, by the conversation manager, to denote that moderator rights now belong to a different user.

After the moderator rights have been transferred, the first user can switch to his or her replacement device 514 such as a mobile phone. But, because the replacement device 514 does not have the capability to handle the second type of media 512, the first user is now involved only in the first type of media 510 aspect of the conversation.

Figure 6:
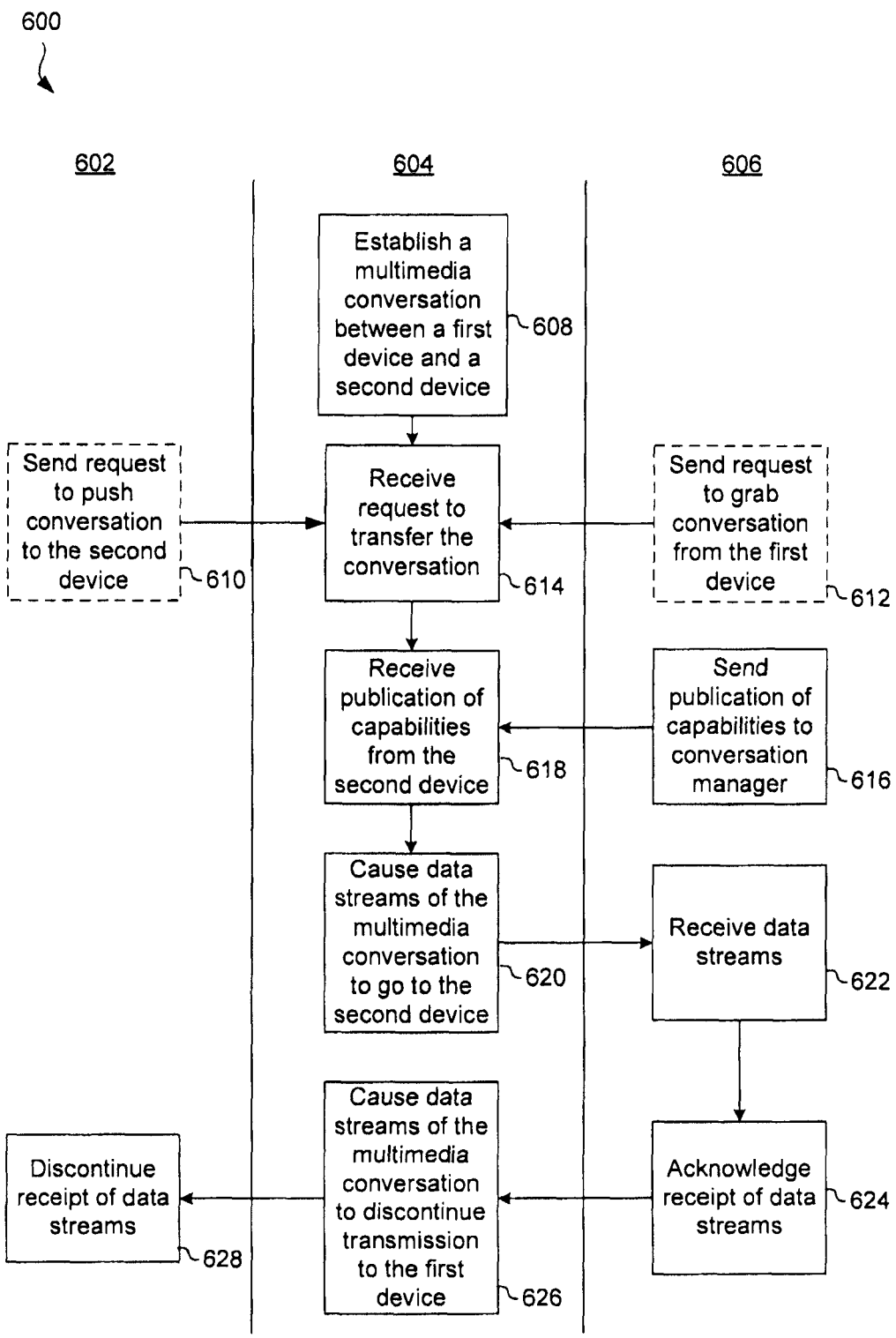
FIG. 6 is a flowchart showing an illustrative method for transferring a multimedia conversation between devices, according to one example of principles described herein.

FIG. 6 is a flowchart showing an illustrative method 600 for transferring a multimedia conversation between devices, particularly, from a first device to a second device. The left column 602 represents steps performed by the first device and the right column 606 represents steps performed by the second device. The middle column represents steps performed by a conversation manager.

According to the present example, at step 608, the conversation manager establishes a multimedia conversation between the first device and the second device. The multimedia conversation includes at least two different types of media. For example, the multimedia conversation may include audio/video conference communication and document sharing communication.

In one example, at step 610, the first device, from which the multimedia conversation is being transferred, sends a request to the conversation manager, the request being to transfer the conversation from the first device to the second device. The request may be sent in response to a user command from the first device. For example, the user of the first device may have the option to select a list of registered devices that are eligible for transferring the conversation.

Alternatively, in one example, at step 612 the request to transfer the conversation is sent from the second device. Thus, the multimedia conversation is grabbed from the first device. For example, in response to a user command on the second device, the second device indicates to the conversation manager that is available to take a conversation. The conversation manager can then determine if the registered user of the second device is currently involved in a conversation on a different device. If so, the conversation can be transferred from that different device (e.g., the first device) to the second device.

Additionally, at step 616, the second device publishes its capabilities to the conversation manager. This allows the conversation manager to determine what data streams from the multimedia conversation should be set up on the new device. In some cases, not all aspects of the conversation may be able to transfer to the second device. As described above, the second device to which the conversation is being transferred may not have the capabilities to handle certain aspects of the call. For example, the second device may be capable of voice but not video. Thus, only the voice aspect of the multimedia conversation is transferred to the second device in such cases.

At step 618, the conversation manager receives the capabilities of the second device. The conversation manager can then determine what types of media should be transferred to the second device. In some cases, each media type involved in the multimedia conversation can be transferred. In some cases, only a subset of the media types involved in the multimedia conversation can be transferred.

At step 620, the conversation manager causes the data streams for the different types of media to be transmitted to the second device. In one example, such data streams are duplicate data streams of the data streams currently being transmitted to the first device. At step 622, the second device receives the data streams and thus becomes a participant in the multimedia conversation.

At step 624, the second device acknowledges successful receipt of each of the data streams for each protocol involved with the different types of media. At step 626, after receiving acknowledgement from the second device, the conversation manager causes the data streams being transmitted to the first device to discontinue transmission. At step 628, the first device ceases to receive the transmission of data streams and thus is no longer part of the multimedia conversation. The user can now continue the multimedia conversation on the second device. Using principles described herein, a user can seamlessly transfer a multimedia conversation (i.e., a conversation involving multiple media types and multiple protocols) between devices during an ongoing conversation.

Some examples of processing systems described herein may include non-transitory, tangible, machine readable media that include executable code that when run by one or more processors (e.g., processor 410, 424) may cause the one or more processors to perform the processes of method 600 as described above. Some common forms of machine readable media that may include the processes of method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a conversation manager in a communications network, the method comprising:
  establishing a multimedia conversation between a first device associated with a first user and at least one endpoint associated with at least one other user, the multimedia conversation comprising at least two different media types according to respective and different protocol types;
  receiving an instruction to transfer the conversation from the first device of the first user to a second device;
  adding the second device to the multimedia conversation by establishing connections for the at least two different media types to the second device;
  removing the first device from the multimedia conversation by removing connections for the at least two media types to the first device;
  determining capabilities of the second device; and
  adding to the second device only media type connections of the multimedia conversation that correspond to the capabilities of the second device.

2. The method of claim 1, wherein the multimedia conversation comprises a first media type connection between the first device and a first endpoint associated with the second user, and a second media type connection between the first device and a second endpoint associated with the second user.

3. A method comprising:
  establishing a multimedia conversation between a first device associated with a first user and at least one endpoint associated with at least one other user, the multimedia conversation comprising at least two different media types according to respective and different protocol types;
  receiving an instruction to transfer the conversation from the first device of the first user to a second device;
  adding the second device to the multimedia conversation by establishing connections for the at least two different media types to the second device;
removing the first device from the multimedia conversation by removing connections for the at least two media types to the first device; and
  before removing the first device from the multimedia conversation, passing moderator control from the first user to the at least one other user.

4. The method of claim 1, wherein the media types include at least two of: voice, video, chat, screen sharing, and document sharing.

5. The method of claim 1, wherein the protocol types include at least two of: RTP, SIP, HTTP, XMPP, REST, and SOAP.

6. The method of claim 1, wherein the first device or the second device comprises at least one of: an application client, a web client, a mobile phone, a tablet, a desktop computer, a laptop computer, and a television set.

7. The method of claim 1, wherein the instruction is received from the first device.

8. The method of claim 1, wherein the instruction is received from the second device.

9. The method of claim 1, wherein the instruction is received in response to a user of the second device moving the second device within a threshold proximity of the first device.

10. A computer program product comprising machine readable instructions on a non-transitory storage medium, the computer program product comprising:
  computer program code for sending a request from a first device to an active device, the request being to grab a multimedia conversation from the active client device, the active client device being active within the multimedia conversation, the multimedia conversation comprising communication sessions that include multiple media types defined by respective media communication protocols; and
  computer program code for establishing a connection with endpoints of the multimedia conversation using at least a subset of the communication protocols of the multimedia conversation;
  computer program code for determining capabilities of the first device; and
  adding to the first device, only media type connections of the multimedia conversation that correspond to the capabilities of the first device;
  wherein establishing the connection includes removing the active client device from the multimedia conversation.

11. The computer program product of claim 10, wherein the endpoints correspond to a single device.

12. The computer program product of claim 10, wherein the endpoints correspond to different devices.

13. The computer program product of claim 12, wherein the different devices are associated with different users.

14. The computer program product of claim 10, further comprising:
  computer program code for publishing capabilities of the first device to the conversation manager.

15. The computer program product of claim 10, wherein sending the request causes moderator rights associated with the active client device to be passed to another multimedia conversation participant.

16. The computer program product of claim 10, wherein the media communication protocols include least two of: RTP, SIP, HTTP, XMPP, REST, and SOAP.

17. A computing system comprising:
  a processor; and
  a memory comprising machine readable instructions that when executed by the processor, cause the system to:
    establish a multimedia conversation between a first device associated with a first user and at least one endpoint associated with at least one other user, the multimedia conversation comprising at least two different media types according to a variety of media protocol types;
    receive an instruction to transfer the conversation from the first device of the first user to a second device;
    add the second device to the multimedia conversation by establishing connections for the at least two different media types to the second device; and
    remove the first device from the multimedia conversation by removing connections for the at least two media types to the first device
    determining capabilities of the second device; and
    adding to the second device only media type connections of the multimedia conversation that correspond to the capabilities of the second device.

18. The system of claim 17, wherein the first client device or the second client device comprises at least one of: an application client, a web client, a mobile phone, a tablet, a desktop computer, a laptop computer, and a television set.

19. The system of claim 17, wherein the machine readable instructions further cause the system to transfer moderator rights away from the first device before adding the second device to the multimedia conversation.

20. The method of claim 1, wherein determining capabilities of the second device comprises receiving a publication of capabilities of the second device from the second device.

21. The method of claim 1, further comprising, storing capabilities of the second device in a data structure.

22. The method of claim 1, further comprising:
   transferring the multimedia conversation to a third device; and
   reestablishing a media type that was not transferred to the second device.

23. The computer program product of claim 10, further comprising computer program code for sending to a conversation manager, a request to transfer the multimedia conversation to a third device, the third device having capabilities similar to the active device.

24. The system of claim 17, wherein the machine readable instructions further cause the system to receive from the second device, a publication of capabilities of the second device from the second device.

25. The system of claim 24, wherein the machine readable instructions further cause the system to store the capabilities of the second device from the second device in association with a conversation identifier.

26. The system of claim 17, wherein the machine readable instructions further cause the system to receive a second instruction to transfer the conversation from the second device to a third device of the user.

27. The system of claim 17, wherein the machine readable instructions further cause the system to:
   add the third device to the multimedia conversation by establishing connections directed to the second device to the third device; and
   remove the second device from the multimedia conversation by removing connections directed to the second device.

28. The system of claim 27, wherein the machine readable instructions further cause the system to add connections for media types that were established with the first device and were not established with the second device.

* * * * *